United States Patent [19]

Cosner

[11] Patent Number: 4,923,771
[45] Date of Patent: May 8, 1990

[54] DIAMOND-SHAPED MASK FOR MAKING MULTIPLE EXPOSURE HOLOGRAMS

[75] Inventor: Lane W. Cosner, Hermosa Beach, Calif.

[73] Assignee: Hughes Aircraft Company, Los Angeles, Calif.

[21] Appl. No.: 168,115

[22] Filed: Mar. 14, 1988

[51] Int. Cl.$^5$ ............................ G03H 1/04; B60Q 1/00
[52] U.S. Cl. ............................................. 430/1; 430/2; 430/394; 350/3.67; 350/3.75; 350/3.81; 350/3.83; 350/3.85; 340/705; 353/14
[58] Field of Search ............ 430/1, 2, 394, 396; 350/3.73.3.7, 3.75, 3.67, 3.81, 3.83, 3.84, 3.85, 3.68, 3.78, 3.76, 3.79, 162.18; 340/47, 103; 353/14, 13

[56] References Cited

U.S. PATENT DOCUMENTS

| | | | |
|---|---|---|---|
| 4,018,503 | 4/1977 | Silverman et al. | 350/3.68 |
| 4,094,011 | 6/1978 | Nagao | 430/1 |
| 4,451,114 | 5/1984 | Nicholson et al. | 350/3.75 |
| 4,547,037 | 10/1985 | Case | 350/3.75 |
| 4,795,223 | 1/1989 | Moss | 350/3.75 |

Primary Examiner—Jose Dees
Assistant Examiner—Donald J. Luney
Attorney, Agent, or Firm—Leonard A. Alkov; Wanda Denson-Low

[57] ABSTRACT

A method and apparatus for forming a multiple exposure hologram includes an object beam cut out mask 24 and reference beam cut out mask 60. Different segments of the masks are left uncovered during each exposure step and operate to shape the reference 18 and object 16 beams so that they illuminate selected areas of the photosensitive plate 12. The angle of incidence of the object beam 16 remains constant during each exposure step while the reference beam 18 illuminates the plate 12 at different angles during each exposure step. During playback, a plurality of lamps 94–106 project reconstruction beams at the hologram 12 to individually or collectively render the holographic segments viewable with a minimum of crosstalk between each segment. In the preferred embodiment, the reference beam mask includes diamond-shaped cut outs 62–74 which are selectively used with associated object beam mask cut outs 28–40 to generate a hologram in the form of a seven-segment display.

7 Claims, 3 Drawing Sheets

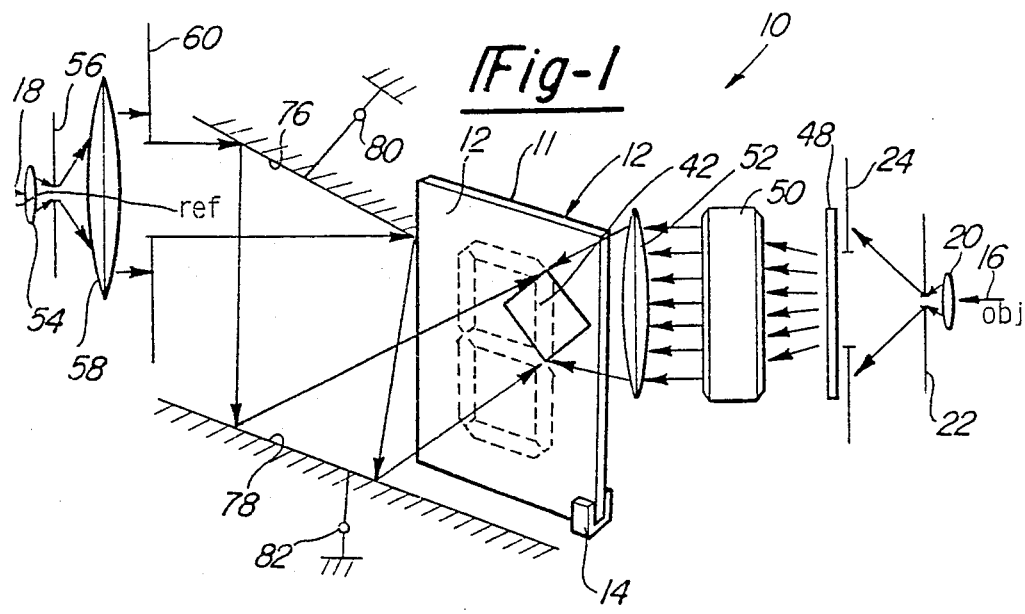
*Fig-1*
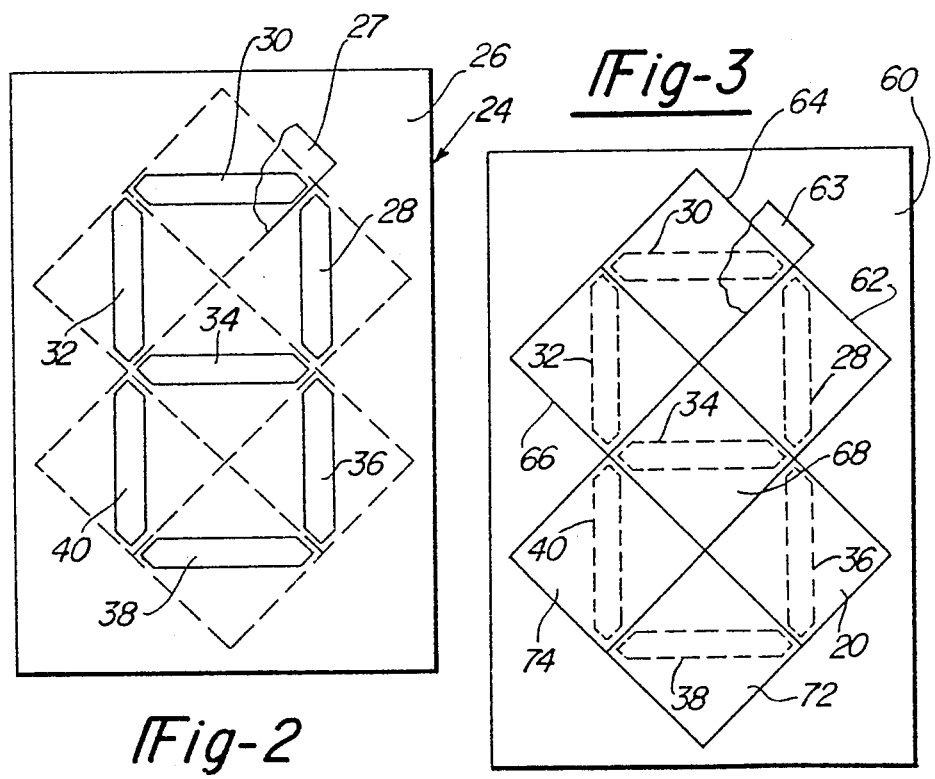
*Fig-2*
*Fig-3*

DIAMOND-SHAPED MASK FOR MAKING MULTIPLE EXPOSURE HOLOGRAMS

CROSS REFERENCE TO RELATED APPLICATION

The subject matter of this application is related to co-pending U.S. Ser. No. 168,114, filed Mar. 14, 1988, entitled "Multiple Exposure Holograms For Minimizing Crosstalk" by the same inventor and assigned to the same assignee as the present invention.

BACKGROUND OF THE INVENTION

1. Technical Field

This invention relates to methods of making holograms and, more particularly, to techniques for eliminating crosstalk in multiple exposure holograms.

2. Discussion

There exists several applications for multiple holographic images formed on a common substrate. One such application would be the formation of a seven-segment alphanumeric display. Each segment of the display could be formed by a separate hologram on a common substrate. Each hologram could be played back individually or collectively by appropriate reconstruction beams during a playback mode in order to form a desired letter or number from the display.

One possible technique for forming multiple exposure holograms is to illuminate different areas on a photosensitive substrate with an object beam while the reference beam illuminates all of the photosensitive material. One disadvantage with this technique is that a noticeable amount of interference or "crosstalk" would be generated during playback. In other words, it is difficult to make one but not the other of the holograms visible during playback. This is believed to be due to the fact that the reference beam encompassed a common area of the photosensitive plate where both object beam images were focused during exposure of the two holograms. Another disadvantage is that during construction of the first holographic image the first exposure of the gel would harden it. Consequently, any subsequent exposures would not have the same efficiency as the first exposure, without considerably boosting exposure times or taking other undesirable measures.

SUMMARY OF THE INVENTION

Pursuant to the present invention, a multiple exposure hologram in the form of a seven-segment display is formed so as to minimize crosstalk and to also provide a wide viewing angle or "eye box" for the viewer during playback. The object beam during each exposure step is shaped into one or more segments for the display. Preferably, this is accomplished by utilizing an object beam mask with a plurality of cut outs, each cut out defining a generally rectangular segment shape. In contrast, a mask for the reference beam has cut outs therein in the form of a plurality of diamonds. The diamond shaped cut outs are arranged in a compact, nonoverlapping pattern having a central cut out for the middle horizontal segment and six substantially similar cut outs surrounding and contiguous to the central cut out. The cut outs in both masks are selectively used during a plurality of exposure steps for creating a holographic image in the form of a seven-segment display. After developing, the resultant hologram can be viewed at a relatively wide angle by playback beams striking the plate at angles associated with the angles at which the reference beam struck the plate during the exposure steps. In addition to providing the viewer with a wide viewing angle or "eye box", the resultant hologram substantially eliminates crosstalk between the segments during playback.

BRIEF DESCRIPTION OF THE DRAWINGS

The various advantages of the present invention will become apparent to those skilled in the art after reading the following specification and by reference to the drawings in which:

FIG. 1 is a diagram of an optical system that can be used to create a multiple exposure hologram in accordance with the teachings of the present invention;

FIG. 2 is a plan view of an object beam mask, with the shape of the associated reference beam mask illustrated with dotted lines;

FIG. 3 is a plan view of a reference beam mask, with the relative shape of the associated object beam mask being illustrated in dotted lines;

DESCRIPTION OF THE PREFERRED EMBODIMENT

Figure 4:
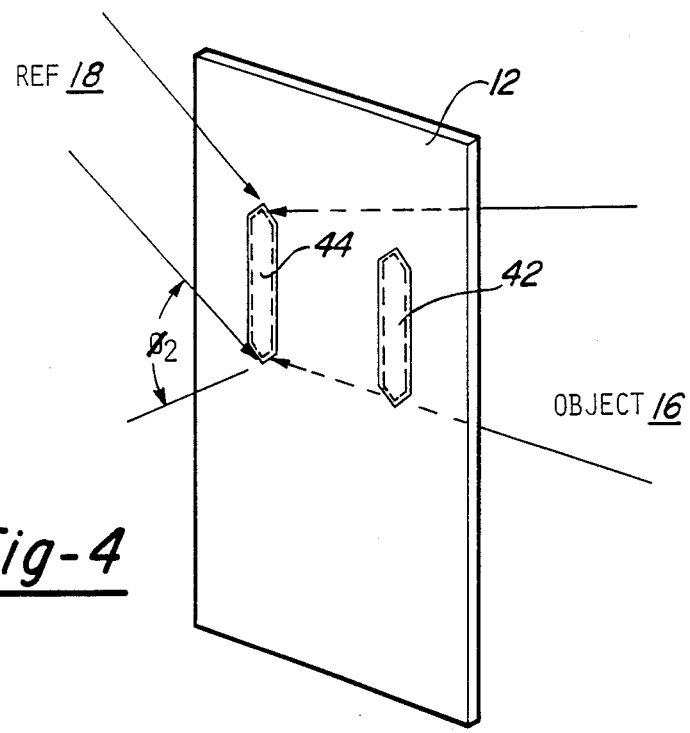
FIG. 4 is an enlarged view of the photosensitive plate during a second exposure step where the second holographic image is formed.

FIG. 1 illustrates an optical system 10 for carrying out the method of the present invention. A photosensitive plate 12 is fixed by a suitable support 14 in the optical system for receiving coherent light on opposite sides 11, 13 thereof from an object beam 16 and reference beam 18, respectively. Plate 12 may be formed of any suitable photosensitive medium conventionally used in forming holograms. In this embodiment, plate 12 has a transparent glass substrate on the reference beam side 13 and is coated with dichromated gelatin on the object beam side 11. The object and reference beams are generated by any suitable coherent light source as an argon laser. Conventionally, the initial laser beam passes through suitable beam splitters and reflective mirrors (not shown) to generate the reference and object beams.

The object beam 16 passes through an objective lens 20 which focuses it through a spatial pin hole filter 22 which expands the beam and eliminates noise therein. The expanded beam illuminates an object beam mask 24 which is illustrated in more detail in FIG. 2. The mask 24 takes the form of an opaque film 26 having a plurality of cut outs 28-40 formed therein. Preferably, the cut outs are arranged to form a conventional seven-segment alphanumeric display. Each segment is generally rectangular in shape with tapered ends which nest with the tapered ends of adjacent segments. As will appear, the cut outs 30-40 are all covered with tape 27 except for the segment that is to define the area on the plate 12 to be illuminated during construction. As will be described in more detail, seven different holograms will be formed on different areas of plate 12 during seven different exposure steps. In FIG. 1, cut out 28 is left uncovered for forming the first holographic image generally designated by the numeral 42 in FIG. 1.

The object beam passing through the uncovered cut out in mask 24 passes through a milky ground glass diffusion plate 48. The diffusion plate serves to help give the ultimate viewer a wide viewing angle upon reconstruction or playback. It should be noted that it is possible to mask off parts of the diffusion plate 48 instead of having a separate mask 24. After the "shaped" object beam has projected through this diffuse aperture it passes through a relay lens system 50 and a field lens 52. The relay lens system 50 serves as a light gathering tool and collimates the shaped object beam while the field lens focuses the object beam to the plane of the holographic plate 12. The holographic plate 12 can be at an angle, such as 32 degrees, to the major optical axis of the object beam. The purpose of this angle in this case is to match a particular windshield angle for a particular car, so that the segmented display will appear vertical or bisecting the windshield upon playback.

In FIG. 1 the dotted lines represent the area of the holographic plate 12 that is illuminated by the shaped object beam. The reference beam 18 is shaped so that it illuminates the opposite side of holographic plate 12 in a diamond-shaped area covering the area in which the object beam 16 illuminates the holographic plate 12. The area illuminated by the reference beam 18 is illustrated in solid lines in the drawings. As can be seen, the diamond-shaped reference beam illuminates the plate so that the rectangular area illuminated by the object beam lies between opposite apices of the diamond-shaped area illuminated by the reference beam.

The reference beam optical subsystem includes an objective lens 54 and a pin hole filter 56 for expanding the reference beam 18. The expanded beam projects through a collimating lens 58 and then through a selected, uncovered cut out in a reference beam mask 60. The reference beam mask 60 is shown in FIG. 3, with the cut outs in the associated object beam mask being illustrated in dotted lines. Reference beam mask 60 has a plurality of diamond-shaped cut outs 62–74. The cut outs are arranged in a compact, nonoverlapping manner. A central diamond-shaped cut out 68 is surrounded by six substantially similar cut outs 62, 64, 66, 70, 72 and 74. The central cut out 68 of the reference beam mask 60 is for use when exposing the holographic image for the middle horizontal segment of the seven-segment display, the cut out 34 being used in the object mask. The other cut outs in the reference mask 60 are similarly associated with selected object beam mask cut outs as illustrated in FIG. 3. Tape 63 is similarly used to cover unwanted cut outs during the exposure steps.

A series of mirrors 76 and 78 are employed to direct the shaped reference beam to the opposite side 13 of plate 12 at a selected angle. Adjustment mechanisms simplistically illustrated at 80 and 82 are provided for adjusting the desired angle of incidence.

The method of this invention will be described in connection with a specific example. The first holographic image 42 is formed by passing an argon laser object beam 16 through cut out 28 so that the shaped beam strikes the gelatin side of plate 12 at a 32 degree angle relative to the optical axis of the object beam. The reference beam 18 passes through cut out 62 in mask 60 (the other cut outs being covered) and strikes the area on the opposite side 13 of plate 12 at an upward angle of about 30 degrees. It should be noted in practice that two holographic images could be simultaneously exposed to reduce the number of exposure steps. For example, the lower left hand segment of the alphanumeric display could also be formed at the same time as segment 42 shown in FIG. 1. In such case the corresponding cut outs 40, 74 in the masks 24, 60 respectively would also be open.

FIG. 4 illustrates a second exposure step in which the object beam 16 remains the same except that it now passes through a different cut out, here cut out 32 in the object beam mask 24. Thus, the object beam strikes a different area on side 11 of the holographic plate 12. Analogously, the reference beam 18 passes through cut out 66 in mask 60 so that it illuminates plate 12 from the opposite side 13 in the area of the second holographic image 44. However, mirrors 76 and 78 are adjusted sot that the reference beam 18 strikes the plate 12 at a different angle than during the first exposure. This angle is represented in FIG. 4 as $\emptyset_2$ and is illustrated at an approximate 30 degree angle shining downwardly onto plate 12. This second exposure step thus creates a second holographic image 44.

Figure 5:
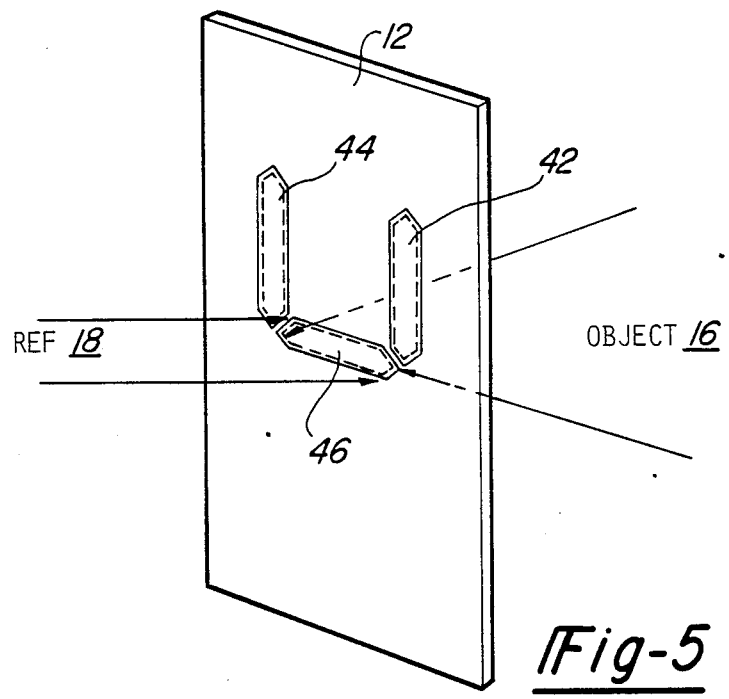
FIG. 5 is an enlarged perspective view of the photosensitive plate during a third exposure step where a third holographic image is formed therein.

A third holographic image 46 is illustrated as being exposed in FIG. 5. During the third exposure step the object beam 16 passes through object mask segment 34 and strikes the third area of the plate 12 at the same angle as in the previous exposures. Reference beam 18 passes through cut out 68 and strikes the opposite surface of plate 12 at still another different angle than the previous two exposures. In this example, reference beam 18 is illustrated as striking the plate 12 normal to its plane. Thus, a latent holographic image 46 for the middle horizontal segment of the display is formed.

This process continues until all of the segments for the display have been exposed. Then, the plate 12 is removed from the fixed position and the latent holographic images are simultaneously developed by using conventional processing to develop the dichromated gelatin.

Figure 6:
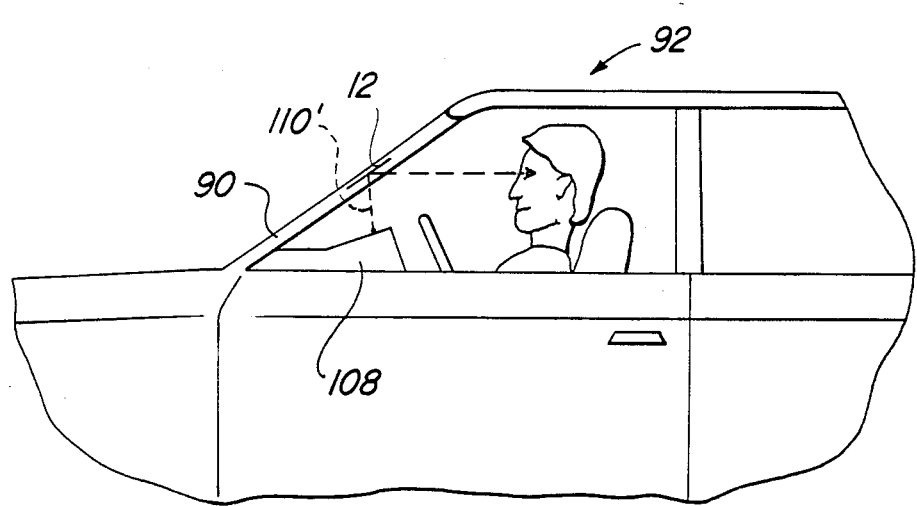
FIG. 6 is a diagrammatic view of the completed hologram in the windshield of a vehicle.
Figure 7:
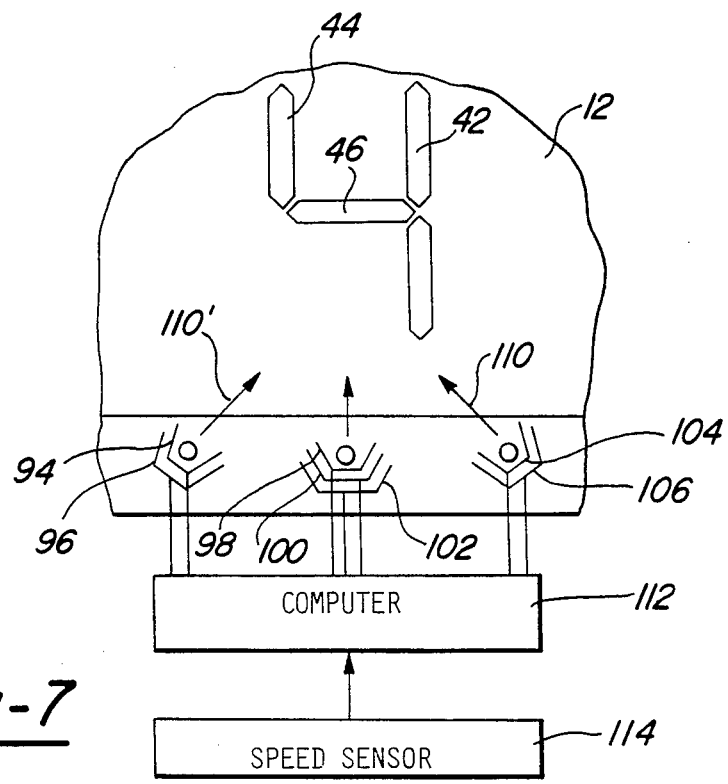
FIG. 7 is a view illustrating apparatus during playback of the hologram of FIG. 6.

Turning now to FIGS. 6 and 7, the developed holographic plate 12 is shown imbedded in a windshield 90 of a vehicle 92. A series of playback lamps 94–106 are suitably mounted in the vehicle dash compartment 108 to generate one or more reconstruction or playback beams 110. Each lamp is directed at the hologram plate 12 at different angles, each angle being associated with the angle of the reference beam during construction of a particular segment of the hologram. For example, lamp 94 serves to direct its beam 110′ towards plate 12 at the same angle that the reference beam 18 was angled at the plate 12 during exposure of segment 42 in FIG. 1. The other lamps 96–106 are similarly angled. Thus, during playback or reconstruction it is possible to make visible one of the segments individually or several of them collectively by energizing one or more of the lamps 94–106. In the illustrated embodiment, each of the lamps is energized by suitable output signals from a microcomputer 112 having an input coupled to an output of a speed sensor 114. As a result, the multiple exposure hologram on plate 12 can be utilized as a speedometer in a type of heads-up display. As the speed of the vehicle changes the computer will convert the signals from the speed sensor 114 to appropriate signals for driving the correct output lamp or lamps to generate the desired combination of segments to form the correct number so that the user can view the speed of the vehicle without taking his eyes off the road ahead. Of course, it is envisioned that more than one hologram may be illuminated to provide a multi-digit display.

It will be appreciated that during playback the lamps will illuminate an overlapping area of the hologram, even though they are directed at the holographic plate 12 at different angles. However, according to the present invention this overlap will not cause unwanted segments to become visible thereby providing a clear, relatively high resolution image. For example, even though lamp 94 illuminates the entire holographic plate 12, it will render only the segment 42 visible because of the aforementioned exposure techniques. However, if other segments were exposed with the same reference beam angle one would avoid overlapping these segments. This is why it is preferable to separate the commonly exposed areas as much as possible.

Various other advantages will become apparent to those skilled in the art after a study of the specification, drawings and following claims. For example, the present invention was described in connection with making a reflection hologram where the reference beam struck the plate from a side opposite the side struck by the object beam. However, this invention can be used in other types of holograms where both the reference and object beams strike the same side of the plate. The diamond-shaped reference beam cut out mask with its neatly meshed individual cut outs permits an extremely wide field of view while at the same time also eliminating crosstalk. The surface hologram effect also has a pleasing aspect with this particular design.

What is claimed is:

1. A method of making a multiple exposure hologram so as to minimize crosstalk and provide a wide viewing angle during playback, said method comprising:
   (a) illuminating first and second generally rectangular areas of a photosensitive plate from one side thereof at a given angle with an object beam, wherein the object beam is directed towards one surface of the plate through a first opaque mask with a plurality of cut-outs therein, each cut out being generally rectangular in shape and arranged as a seven-segment display which includes a middle horizontal segment;
   (b) illuminating said plate at a first angle with a diamond-shaped reference beam so that the rectangular area illuminated by the object beam lies laterally between opposite apices of the diamond-shaped area illuminated by the reference beam thereby creating a first holographic image in one segment of the plate;
   (c) illuminating said plate at a second angle with a second diamond-shaped reference beam so that the second rectangular area illuminated by the object beam lies laterally between opposite apices of the second diamond-shaped area illuminated by the reference beam thereby creating a second holographic image in another segment of the plate;
   (d) developing the photosensitive plate to form a hologram with multiple holographic images therein on different segments thereof;
   wherein steps (b) and (c) include directing said reference beam towards the opposite surface of the plate through a second opaque mask with a plurality of diamond-shaped cut outs therein, the cut outs being arranged in a compact, non-overlapping pattern with a central cut out for the middle horizontal segment and six substantially similar cut outs surrounding and contiguous to the central cutout; and
   whereby said first and second holographic images can be played back by selectively illuminating the plate with playback beams striking the plate at angles associated with the first and second angles of the reference beam during steps (b) and (c) thereby substantially eliminating crosstalk during playback while providing a relatively wide viewing angle.

2. The method of claim 1 wherein steps (b) and (c) include:
   adjusting mirrors disposed between the second mask and the plate so that the reference beam strikes the plate at a different angle during each exposure.

3. The method of claim 2 wherein seven separate exposure steps, one for each segment of the display, are performed before developing the plate.

4. The method of claim 3 which further comprises:
   mounting the plate in a windshield of a vehicle; and
   selectively illuminating the plate with lamps projecting playback beams at the plate at different angles so that a combination of segments in the plate become visible to a driver in the form of a number or letter.

5. A method of making a hologram in the form of a seven-segment alphanumeric display, said method comprising:
   exposing a photosensitive plate in a multiple number of steps, each step using cut outs in masks for an object and reference beam to selectively illuminate only certain segments of the plate while preventing light from striking other areas of the plate, the object beam striking the plate from one side thereof at the same angle during each exposure step while the reference beam strikes the plate from the other side thereof at different angles during each exposure step, the cut outs in the object beam mask corresponding in shape and arrangement to the display segments, with the cut outs in the reference beam mask being diamond shaped.

6. The method of claim 5 wherein the cut outs in the reference beam are arranged in a compact, nonoverlapping manner.

7. The method of claim 5 which further comprises:
   using a plurality of selectively energizable lamps to project playback beams at the hologram at different angles to create a visible number or letter.

* * * * *